United States Patent [19]

Kawaguchi et al.

[11] Patent Number: 4,545,546
[45] Date of Patent: Oct. 8, 1985

[54] WEBBING TENSION DEVICE

[75] Inventors: Teruhiko Kawaguchi; Takayuki Ando, both of Niwa, Japan

[73] Assignee: Kabushiki Kaisha Tokai Rika Denki Seisakusho, Aichi, Japan

[21] Appl. No.: 515,931

[22] Filed: Jul. 20, 1983

[30] Foreign Application Priority Data

Jul. 22, 1982 [JP] Japan .......................... 57-111303[U]

[51] Int. Cl.⁴ ...................... A62B 35/02; B65H 75/48
[52] U.S. Cl. .................................... 242/107; 280/806
[58] Field of Search .......... 242/107, 107.4 R–107.4 E; 280/806; 297/475–478, 480

[56] References Cited

U.S. PATENT DOCUMENTS 4,447,017 5/1984 Inukai ........................ 242/107.4 A
4,471,918 9/1984 Ando ................................ 242/107

Primary Examiner—John M. Jillions
Attorney, Agent, or Firm—George J. Brandt, Jr.

[57] ABSTRACT

In an emergency situation of a vehicle, when an acceleration sensor moves an action lever up to a middle point, a forcing means rotates the action lever in its working direction and a pawl is separated from an action wheel by the rotating force of the action lever. Accordingly, a webbing takeup shaft is driven by the action wheel and an occupant restraining webbing is wound on to the webbing takeup shaft, whereby the occupant restraining webbing is caused to secure an occupant tightly, that is, an occupant restraining performance is enhanced.

17 Claims, 8 Drawing Figures

WEBBING TENSION DEVICE

BACKGROUND OF THE INVENTION

1. Field of the Invention

The present invention relates to a webbing tension device, used in a seatbelt system for protecting an occupant in an emergency situation of such a vehicle as an automobile and giving a tensile force to an occupant restraining webbing to restrain the occupant in an emergency situation.

2. Description of the Prior Art

A seatbelt system for protecting an occupant in an emergency situation of a vehicle is so constructed that an occupant restraining webbing, one end thereof being fixed to the vehicle body and the other end thereof being retracted in layers into a webbing retractor, is worn by the occupant and the occupant is restrained by the webbing in an emergency situation.

The webbing retractor winding the webbing therein gives a predetermined tension to the webbing. However, the winding force of the webbing retractor is made weak or it is caused to disappear wholly so as not to give a feeling of constriction to the occupant, which results in that a slight gap exists between the webbing and the occupant. Accordingly, it will happen that the occupant can move the amount of the gap in the moving direction of the vehicle until the occupant is restrained reliably by the webbing after the drawing of the webbing from the webbing retractor is stopped in an emergency situation.

For this reason a webbing tension device for transmitting an elastic force of a spring such as a spiral spring to a takeup shaft of the webbing retractor to give a tensile force to the webbing, has been proposed in the prior art. In the webbing tension device, an action wheel receiving the elastic force is engaged with a pawl and the pawl is forcibly separated from the action wheel by an acceleration sensor such as a pendulum or the like in the emergency, whereby an action wheel is caused to rotate.

In such prior art webbing tension device, however, if the pendulum is used as an acceleration sensor, the driving force of the pendulum is amplified by utilizing a leverage so as to be transmitted to the pawl or the detecting signal of the acceleration sensor is amplified to be transmitted to the pawl by the magnetic force of a solenoid or the like because the driving force of the pendulum is small.

SUMMARY OF THE INVENTION

In view of the foregoing, the present invention has as its object the provision of a webbing tension device, capable of transmitting the driving force of the acceleration sensor effectively to the pawl so as to drive the pawl rapidly.

In the webbing tension device according to the present invention, an action lever is connected to a forcing means for forcibly rotating the action lever in an action lever anti-working direction, when the action lever passes a middle point in the anti-working direction, for rotating the action lever in its working direction, and the action lever is rotated up to said middle point by an acceleration sensor in an emergency, whereby the action lever is then rapidly rotated in the working direction by a spring force of the forcing means and the pawl rapidly separated from the action wheel.

Accordingly, in the webbing tension device according to the present invention, the action lever is always forced in the anti-working direction in an ordinary, or normal, situation, but in an emergency situation when the action lever is moved over the middle point in the working direction by the acceleration sensor, the pawl is separated rapidly from the actionwheel by such the forcing means of a spring. Thus, in the webbing tension device the driving force driving the pawl can be generated by the forcing means, whereby the rotation of the action wheel can be made easy and reliable. In addition, the webbing tension device according to the present invention can be housed in a webbing retractor together with the acceleration sensor without need to use another type of driving means such as a solenoid.

Description will hereinunder be given of embodiments of the present invention with reference to the attached drawings.

DESCRIPTION OF THE PREFERRED EMBODIMENTS

Figure 1:
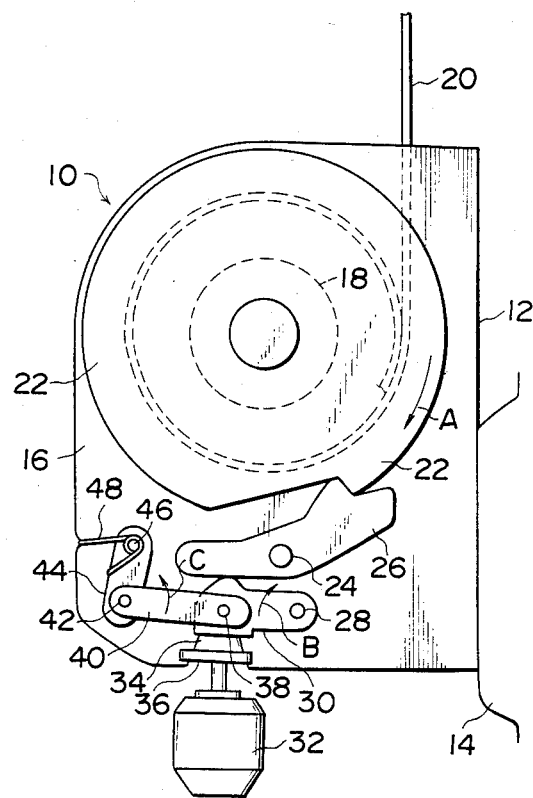
FIG. 1 is a side view showing a seatbelt device to which a first embodiment of a webbing tension device according to the present invention is applied, the depiction being that of a normal situation.
Figure 2:
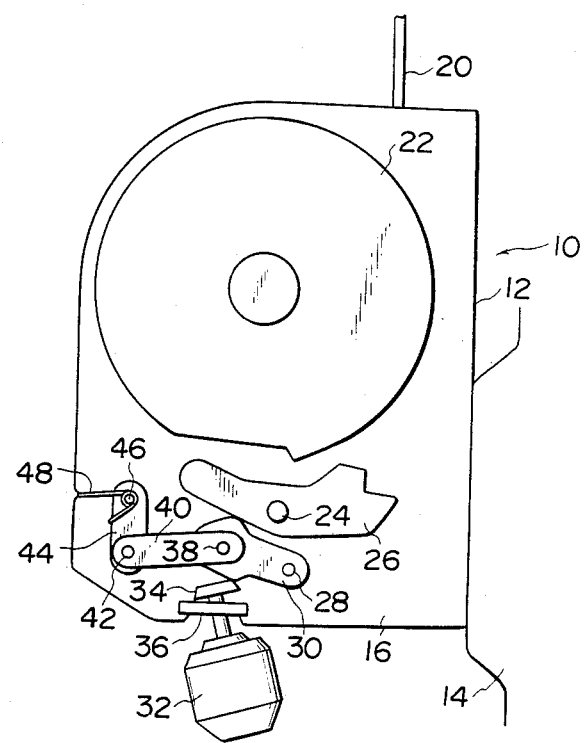
FIG. 2 is a partial side view of the seatbelt device shown in FIG. 1 during an emergency situation.

In FIGS. 1 and 2 a webbing retractor 10 to which a webbing tension device according to a first embodiment of the present invention is applied is shown. In the webbing retractor 10, a frame 12 thereof is fixed to a vehicle body 14, a takeup shaft 18 is rotatably supported between a pair of leg plates 16 extending at a right angle from both the side portions of the frame 12, and one end portion of an occupant restraining webbing 20 is wound in layers on to the takeup shaft 18. The other end portion (not shown) of the webbing 20 is provided with a fixing portion to be fixed to the vehicle body 14 and the middle portion thereof is worn by an occupant. The takeup shaft 18 is given a weak elastic force by a coil spring or the like (not shown), whereby a weak winding force is given to the webbing 20.

Rotatably supported at the outside of the leg plate 16 coaxially with the takeup shaft 18 is an action wheel 22. The action wheel 22 is given a strong winding force by a coil spring or the like (not shown), whereby, when the action wheel 22 is rotated in a direction of winding the webbing 20 (in a direction of arrow A shown in FIG. 1), the rotating force of the action wheel 22 is transmitted to the takeup shaft 18 through a clutch means (not shown) connecting the takeup shaft 18 and the action wheel 22.

However, the action wheel 22 is engaged with a pawl 26 pivotally supported to the leg plate 16 through a pin 24, so that the action wheel 22 normally is prevented from rotating in the direction of winding the webbing 20.

The end portion of the pawl 26 opposite to the engaging portion thereof engaged with the action wheel 22 abuts on a first actiion lever 30 rotatably supported to the leg plate 16 through a pin 28. A portion of the first action lever 30 opposed to the pawl 26 is put on the top portion 34 of a pendulum 32. The pendulum 32 is suspended by a bracket 36 fixed to the leg plate 16, and when the pendulum 32 is inclined, as shown in FIG. 2, the first action lever 30 is rotated in its working, or rotating, direction, i.e., in a direction of an arrow mark B shown in FIG. 1, whereby the pawl 26 is rotated in the same direction as it is separated from the action wheel 22. Accordingly, the pendulum 32 functions as an acceleration sensor.

Rotatably supported to an end portion of the first action lever 30 through a connecting pin 38 is one end portion of a second action lever 40. The other end portion of the second action lever 40 is rotatably supported to an end portion of a third action lever 44 through a connecting pin 42. A base portion of the third action lever 44 is rotatably supported to the leg plate 16 through a pin 46.

The rotation of the second action lever 40 in its working direction is a direction of an arrow mark C shown in FIG. 1. The second action lever 40 is rotated together with the first action lever 30 in the working direction, i.e. in the direction of the arrow mark C, so as to rotate the pawl 26. In addition, the third action lever 44 is provided with a torsion coil spring 48 connecting with the leg plate 16, and the torsion coil spring 48 forces the connecting pin 42 in the same direction causing the connecting pin 42 to approach the pin 28.

Also, the connecting pin 38 is arranged in a normal situation of the vehicle such that the axial center thereof is positioned slightly below a straight line connecting the connecting pin 42 and the pin 28, that is, on the side of the pendulum 32, as shown in FIG. 1, whereby the torsion coil spring 48 forces the first and second action levers 30, 40 in the anti-working directions, i.e., in directions reverse to the directions of the arrow mark B and C, to push the first action lever 30 against the top portion 34 of the pendulum 32. However, when the first and second action levers 30 and 40 are rotated in the working directions, i.e., in the directions of the arrow marks B and C, respectively, to cause the connecting pin 38 to traverse the straight line connecting the connecting pin 42 and the pin 28, i.e., a middle point, the respective first and second action levers are rotated suddenly in the directions of the arrow marks B and C by a spring force of the torsion coil spring 48. In this state, therefore, the force rotating the pawl 26 does not depend on a pushing-up force of the pendulum 32 but it depends on the spring force of the torsion coil spring 48, so that a large driving force for rotating the pawl 26 can be obtained.

In the webbing retractor 10 to which the webbing tension device according to the first embodiment is applied, the occupant wears the webbing 20 and, thereafter, the vehicle is put in its running situation. In this running situation, since the respective first and second action levers 30 and 40 are urged to rotate in the anti-working directions by the spring force of the torsion coil spring 48, the pawl 26 is not rotated in the same direction as the pawl 26 is separated from the action wheel 22.

However, when the vehicle is in such an emergency situation as a vehicle collision, the pendulum 32 is inclined due to an acceleration of the vehicle, as shown in FIG. 2, the respective first and second action levers 30 and 40 are rotated in the directions of the arrow marks B and C, i.e., in the working directions. When the connecting pin 38 traverses the middle point, the first and second action levers 30 and 40 are rotated rapidly in the directions of the arrow marks B and C by the spring force of the torsion coil spring 48, whereby the pawl 26 is rotated in a clockwise direction by a large force. Accordingly, the pawl 26 is separated rapidly and reliably from the action wheel 22.

As a result, the action wheel 22 is rotated suddenly in the direction of the arrow mark A by a spring force of a coil spring (not shown) and the webbing 20 is wound on to the takeup shaft 18, so that a slight gap between the webbing 20 and the occupant wearing the webbing 20 is caused to disappear.

In this manner, since the webbing 20 is now worn tightly by the occupant in the emergency situation of the vehicle, an occupant restraining performance is enhanced and a safety of the occupant is maintained reliably. In addition, if an inertia locking mechanism preventing the webbing 20 from being unwound in the emergency situation of the vehicle is mounted on the webbing retractor 10, the unwinding of the webbing 20 is obstructed reliably, whereby the safety of the occupant is further enhanced.

Figure 3:
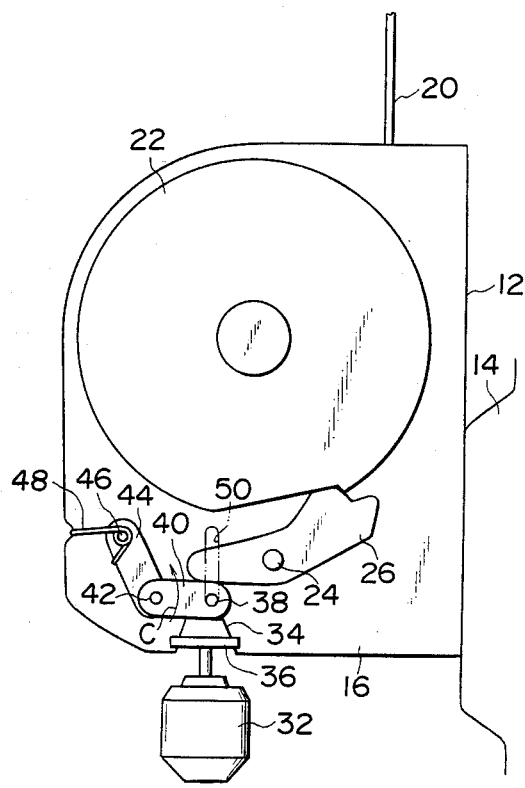
FIG. 3 is a side view showing a seatbelt device to which a second embodiment of a webbing tension device according to the present invention is applied and depicting a normal situation.
Figure 4:
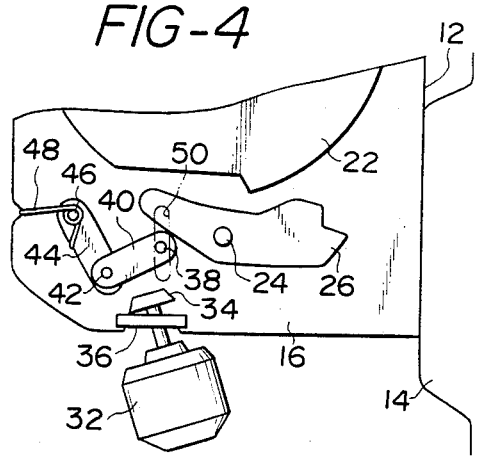
FIG. 4 is a partial side view showing a main portion of the seatbelt device shown in FIG. 3 and during an emergency situation.

Next, FIGS. 3 and 4 show a second embodiment according to the present invention. This second embodiment is not provided with the first action lever 30 provided in the above first embodiment. Instead of the first action lever 30, a cover (not shown) to be fixed to the leg plate 16 is formed with a guide long slot 50. The connecting pin 38 is received in the guide slot 50 and it is movable along the guide slot 50 in a longitudinal direction thereof.

The guide slot 50 extends in a up and down direction, as shown in FIG. 3. Also, the connecting pin 38 is arranged such that the axis center thereof is positioned at a place which is slightly nearer to the pendulum 32 than a straight line passing the axial center of the connecting pin 42 and traversing the longitudinal axial line of the guide slot 50 at a right angle, so that the torsion coil spring 48 forces the second action lever 40 in its anti-working direction, i.e., in a direction reverse to a direction of an arrow mark C, as shown in FIG. 3. However, when the connecting pin 38 traverses the middle point, that is, a straight line passing the axial center of the connecting pin 42 and traversing the longitudinal axial line of the guide slit 50 at a right angle, the connecting pin 38 is elevated suddenly along the guide slot 50 by the spring force of the torsion coil spring 48, as shown in FIG. 4, so that the pawl 26 is separated rapidly from the action wheel 22.

In the second embodiment, therefore, the pawl 26 can be separated rapidly and reliably from the action wheel 22 by the spring force of the torsion coil spring 48 in the same manner as in the first embodiment, as shown in FIG. 4. Furthermore, in the second embodiment the number of the action levers, i.e. the number of parts, is decreased, as compared with the first embodiment.

Figure 5:
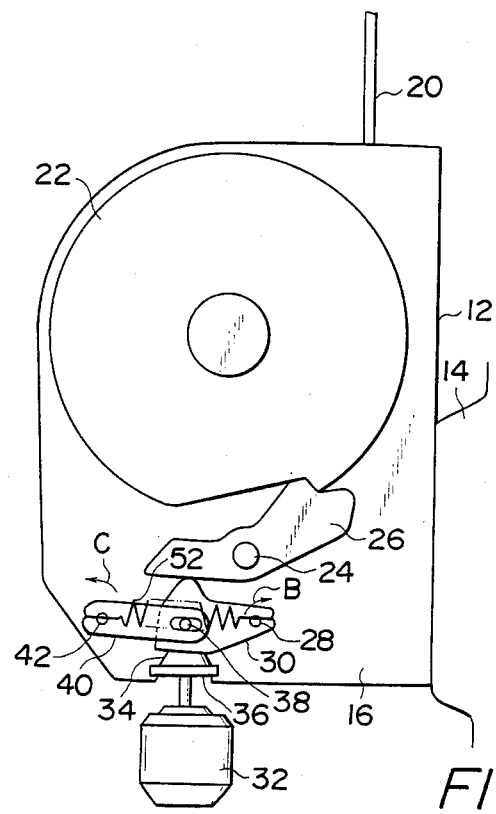
FIG. 5 is a side view showing a seatbelt device to which a third embodiment of a webbing tension device according to the present invention is applied and depicting a normal situation.
Figure 6:
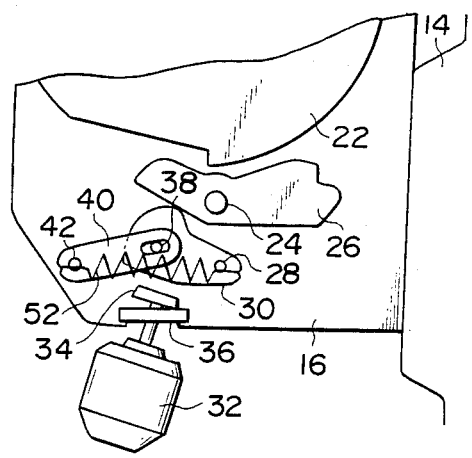
FIG. 6 is a partial side view showing a main portion of the seatbelt device shown in FIG. 5 and during an emergency situation.

In addition, FIGS. 5 and 6 show a third embodiment according to the present invention. The third embodiment is not provided with the third action lever 44 provided in the above first embodiment. In the third embodiment the connecting pin 42 of the second action lever 40 is fixed to the leg plate 16 and the second action lever 40 is rotatable about the connecting pin 42. Also, the first and second action levers 30 and 40 are provided between their end portions with a tension coil spring 52. One end of the tension coil spring 52 is fixed to a portion of the first action lever 30 opposite to the connecting pin 38, i.e., centering the pin 28, i.e., an outside portion of the pin 28, and the other end of the tension coil spring 52 is fixed to a portion of the second action lever 40 opposite to the connecting pin 38, centering the connecting pin 42, i.e., an outside portion of the connecting pin 42, as shown in FIG. 5. The axial line of the tension coil spring 52 is positioned slightly nearer to the pawl 26 than a straight line connecting the pin 28 and the connecting pin 42, as shown in FIG. 5. A hole for receiving the connecting pin 38 of the second action lever 40 is formed elongated as shown.

In the third embodiment thus constructed, both the action levers 30 and 40 are forced in their anti-working directions, i.e. directions reverse to directions of arrow marks B and C, as shown in FIG. 5, and they are subjected to a pushing-up force by the pendulum 32. When the axial line of the tension coil spring 52 traverses the middle point, i.e. the straight line connecting the pin 28 and the connecting pin 42, the first and second action levers 30 and 40 are rotated rapidly in their working directions, i.e., in directions of the arrow mark B and C shown in FIG. 5.

Accordingly, in the third embodiment, the pawl 26 is separated rapidly and reliably from the action wheel 22 by the spring force of the tension coil spring 52 in an emergency situation of the vehicle, so that the action wheel 22 can be rotated rapidly as well as the respective first and second embodiments. In addition thereto, the third embodiment is not formed with the guide slit 50 formed in the second embodiment, thereby making it easy to maintain accuracy at an assembling time in a high level.

Figure 7:
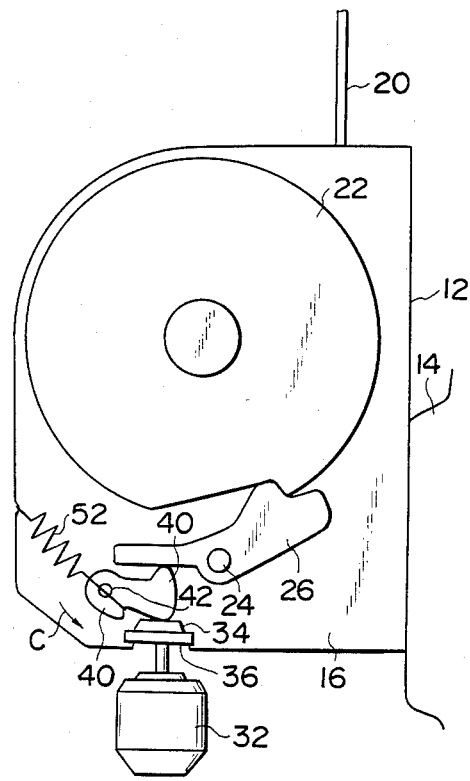
FIG. 7 is a side view showing a seatbelt device to which a fourth embodiment of a webbing tension device according to the present invention is applied and depicting a normal situation.
Figure 8:
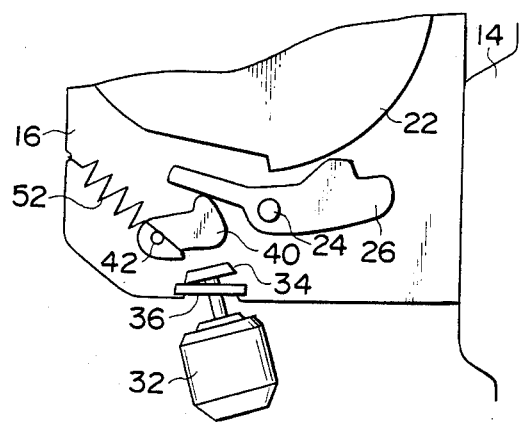
FIG. 8 is a partial side view showing a main portion of the seatbelt device shown in FIG. 7 during an emergency situation.

Furthermore, FIGS. 7 and 8 show a fourth embodiment according to the present invention. The fourth embodiment is not provided with the first action lever 30 provided in the above third embodiment and only the second action lever 40 is rotatably supported to the leg plate 16 through the connecting pin 42.

The second action lever 40 and the leg plate 16 are provided therebetween with the tension coil spring 52, and the axial line of the tension coil spring 52 is shifted slightly from the axial center of the connecting pin 42 to one side, as shown in FIG. 7, in such a manner as the second action lever 40 is forced in its anti-working direction, i.e., in a direction reverse to a direction of an arrow mark C shown in FIG. 7. However, when the axial line of the tension coil spring 52 traverses the axial center of the connecting pin 42 by a slight rotation of the second action lever 40 due to a pushing-up force of the pendulum 32, the second action lever 40 is rotated rapidly in its working direction, i.e. in a direction of the arrow mark C shown in FIG. 7, so that the pawl 26 is pushed up rapidly, as shown in FIG. 8.

Accordingly, in the fourth embodiment, the number of the action levers can be made the fewest, as compared with the above first through third embodiments, and the substantially same functions and advantages as the above embodiments can be obtained.

What is claimed is:

1. A webbing tension device, capable of rotating an action wheel to wind an occupant restraining webbing on a webbing takeup shaft and capable of causing the occupant restraining webbing to secure an occupant tightly to enhance an occupant restraining performance in an emergency situation of a vehicle, which comprises:

(a) a pawl engaged with the action wheel to prevent the action wheel from rotating in a webbing winding direction;

(b) an action lever opposed to the pawl and separating the pawl from the action wheel when the action lever is rotated in a predetermined working direction thereof, said action lever having a normal at rest position, said rest position defining a line of action;

(c) a forcing means engaged with the action lever when the action lever is in normal position and tending to rotate it to one side of said line of action and in a direction opposite to its working direction; and (d) an acceleration sensor opposed to the action lever operable during a vehicle emergency situation to move the action lever from its normal position thereof to the other side of said line of action, the forcing means being operable when said action lever is at said other side of said line of action to rotate the action lever rapidly in the working direction and to thereby cause disengagement of the pawl from the action wheel.

2. A webbing tension device as set forth in claim 1, wherein an intermediate portion of the pawl is rotatably supported to a frame rotatably supporting the webbing takeup shaft, one side of the pawl is engaged with the action wheel and the other side thereof is opposed to the action lever.

3. A webbing tension device as set forth in claim 1, wherein one end portion of the action lever is rotatably supported to a frame rotatably supporting them webbing takeup shaft and a tip end portion thereof is positioned between the pawl and the acceleration sensor.

4. A webbing tension device as set forth in claim 1, wherein one end portion of the first supplementary action lever is rotatably supported to the action lever, the other end portion of the first supplementary action lever is rotatably supported to one end portion of a second supplementary action lever and the other end portion of the second supplementary action lever is rotatably supported to the frame for supporting the webbing takeup shaft, the said one end of the first supplementary action lever being rotated in tandem with the action lever by a spring force.

5. A webbing tension device as set forth in claim 1, wherein the end of the action lever opposed to the pawl is engaged with an elongated slot to guide the movement of said action lever as it moves from one to the other sie of said line of action and vice-versa.

6. A webbing tension device as set forth in claim 1, wherein the action lever comprises a pair of arms, one end of each of the respective arms being rotatably supported to the frame for supporting the webbing takeup shaft, the other end of one of the arms is formed with an elongated hole and the other end of the other arm is provided with a pin received in the hole.

7. A webbing tension device as set forth in claim 6, wherein the pair of arms are provided between one end portions thereof with a tension coil spring and the other end portions thereof are subject to a rotating force in a direction opposite to the working directions of the respective arms.

8. A webbing tension device as set forth in claim 1, wherein the action lever is rotatably supported to the frame for supporting the webbing takeup shaft, the action lever is forced in a direction opposite to the working direction by a tension coil spring arranged between the action lever and the frame, and, when the axial center line of the tension coil spring is moved through the rotatably supported point of the action lever by a slight rotation of the action lever, the action lever is rotated in its working direction.

9. A webbing tension device for winding an occupant restraining webbing to cause the occupant restraining webbing to secure an occupant tightly in an emergency situation of a vehicle, which comprises:
   (a) a frame mounted on a vehicle body;
   (b) a webbing takeup shaft rotatably supported to the frame;
   (c) an action wheel rotating the webbing takeup shaft to wind the occupant restraining webbing in an emergency situation of the vehicle; p1 (d) a pawl engaged with the action wheel to prevent the action wheel from rotation in an ordinary situation of the vehicle;
   (e) an action lever driving the pawl for separating same from the action wheel when said action layer is rotated in a predetermined working direction, said action lever having a normal rest position, said rest position defining a line of action;
   (f) a forcing means engaged with the action lever, said forcing means tending to rotate said action lever to one side of said line of action in a direction opposite to its working direction in the ordinary situation, and
   (g) an acceleration sensor operable in an emergency situation to rotate the action lever to the other side of the said line of action, said forcing means being operable when said action lever is at said other side of said line of action to rapidly rotate said action lever in its working direction and to thereby separate the pawl from the action wheel so that same can be rotated to wind the restraining webbing.

10. A webbing tension device as set forth in claim 9, wherein an intermediate portion of the pawl is rotatably supported to the frame rotatably supporting the webbing takeup shaft, one side of the pawl is engaged with the action wheel and the other side thereof is opposed to the action lever.

11. A webbing tension device as set forth in claim 9, wherein one end portion of the action lever is rotatably supported to the frame rotatably supporting the webbing takeup shaft and a tip end portion thereof is positioned between the pawl and the acceleration sensor.

12. A webbing tension device as set forth in claim 9, wherein one end portion of a first supplementary action lever is rotatably supported to the action lever, the other end portion of the first supplementary action lever is rotatably supported to one end portion of a second supplementary action lever and the other end portion of the second supplementary action lever is rotatably supported to the frame for supporting the webbing takeup shaft, the other end of the first supplementary action lever being rotated in tandem with the action lever by a spring force.

13. A webbing tension device as set forth in claim 9, wherein a part of the action lever is guided along an elongated slot to guide the action lever movement as it moves from one to the other side of said line of action and vice-versa.

14. A webbing tension device as set forth in claim 9, wherein the action lever comprises a pair of arms, one end of each of the respective arms being rotatably supported to the frame for supporting the webbing takeup shaft, the other end of one of the arms is formed with an elongated hole and the other end of the other arm is provided with a pin received in the hole.

15. A webbing tension device as sent forth in claim 14, wherein the pair of arms are provided between one end portions thereof with a tension coil spring and the other end portions thereof are subjected to a rotating force opposite to the working directions of the respective arms.

16. A webbing tension device as set forth in claim 9, wherein the action lever is rotatably supported to the frame for supporting the webbing takeup shaft, the action lever arms are forced in a direction opposite to the working direction by a tension coil spring arranged between the action lever arms and the frame, and, when the axial center line of the tension coil spring is moved through the rotatably support point of the action lever arms by a slight rotation of the action lever arms, the action lever arms are rotated in a working direction.

17. A webbing tension device, wherein a pawl is separated from an action wheel, the action wheel is rotated by a spring force and a webbing takeup shaft is rotated in a webbing winding direction thereof by the rotating force of the action wheel in an emergency situation of a vehicle, which comprises:
   an action lever, one end portion thereof being rotatably supported to said frame for supporting the webbing takeup shaft and the other end portion thereof abutting against the pawl in a normal rest position, said rest position defining a line of action, said action lever separating from said pawl when it is rotated in a predetermined working direction;
   a forcing means engaged with the action lever, said forcing means tending to rotate said action lever to one side of said line of action in opposition to its working direction; and
   an acceleration sensor abutting against the other side of the tip end portion of the action lever and at one side of said line of action, said action lever being operable in an emergency situation to rotate the action lever to the other side of said line of action, said forcing means being operable when said action lever is at said other side of said line of action to rapidly rotate the action lever in its working direction and thereby separate the pawl from the action wheel.

* * * * *